United States Patent Office 3,780,157
Patented Dec. 18, 1973

3,780,157
PROCESS FOR THE PRODUCTION OF REINFORCED POLYAMIDE HOLLOW ARTICLES
Wilhelm Hechlhammer, Kurt Schneider, and Friedrich Fahnler, Krefeld, Germany, assignors to Bayer Aktiengesellschaft, Leverkusen, Germany
No Drawing. Filed Dec. 29, 1971, Ser. No. 213,828
Claims priority, application Germany, Dec. 30, 1970, P 20 64 598.1
Int. Cl. B29c 5/04
U.S. Cl. 264—310
7 Claims

ABSTRACT OF THE DISCLOSURE

The invention relates to a process for the production of reinforced polyamide hollow articles which comprises polymerizing a lactam having at least 5 ring members in the group consisting of a carbodiimide, cyanamide, mono-, polyisocyanate and a masked isocyanate after fibres have been introduced into the mould and heated to the required polymerization temperature in the mould which rotates during the polymerization about two intersecting axes.

---

This invention relates to a process for the production of reinforced articles from polyamides by the activated anionic polymerization of lactams using the rotational-moulding technique, the mouldings being strengthened by glass fibres.

The production of hollow articles, or of open mouldings derived therefrom, by rotational moulding using the process of activated anionic polymerization of lactams is known (see U.S. patent specifications Nos. 3,275,733 and 3,417,097 as well as Belgian patent specification No. 699,587). According to this technique, the polymerizable mixture is filled into a mould which rotates during the polymerization about two intersecting axes at angular velocities at which the resulting centrifugal forces are below the force of gravity.

It is known that the mechanical properties of polyamides such as their hardness, modulus of elasticity and flexural strength, can be considerably improved by the incorporation of inorganic or organic fillers, preferably in the form of fibres. It was also known according to U.S. patent specification No. 3,275,733 to incorporate filler materials such as sand, pigments or plasticizers into the polymerizable mixture, introducing the mixture thus obtained into the mould and producing the reinforced hollow articles by rotation of the mould. According to this process the polymerization mixture and the fillers are already mixed before the mixture is filled into the mould. According to U.S. patent specification No. 3,417,097 the hollow articles can be reinforced by providing a reinforcing web within the mould and by covering the web with polyamide during the polymerization. Therefore, according to this process, the fibres are already orientated in the mould before the polymerization starts.

Depending on the polymerization's promotors the polymerization reaction does not proceed very quickly and, therefore, the formation of the hollow articles lasts long enough that the filler is dispersed throughout the polymerization mixture and is thus uniformly incorporated into the polyamide walls of the article. In case that the fibres have been filled into a mould before being mixed with a lactam melt and the lactam melt has been poured on the fibres, the voluminous fibres have given rise to lump formation in the low viscous melt and could have hardly been dispersed uniformly throughout the lactam by stirring.

Therefore, it was surprising that in spite of introducing the fibres into the mould before the polymerization mixture, because of an easier embodiment of the process, and using high efficient promotors for a fast anionic polymerization, hollow articles of uniform wall's density having the reinforcing fibres uniformly distributed in the walls are built.

The present invention relates to a process for the production of reinforced polyamide hollow articles which comprises polymerizing a lactam having at least 5 ring members in the presence of an alkaline catalyst and a member of the group consisting of a carbodiimide, cyanamide, mono-, polyisocyanate and a masked isocyanate after fibres have been introduced into the mould and heated to the polymerization temperature in the mould which rotates during the polymerization about two intersecting axes.

The rotational speeds are in the range from 5 to 30 r.p.m., depending both upon the geometry and upon the size of the moulding. The surface of the mould is faithfully reproduced. The fibres present in the workpiece cannot be seen on the outer surface, cause little or no discoloration of the mouldings, and, hence, do not give rise to any troublesome surface faults.

The temperature at which the lactam melt is processed in the rotational mould is preferably in the range from 140 to 200° C.

Suitable lactams include all the known anionically polymerizable lactams, such as $\beta$-pyrrolidone, $\epsilon$-caprolactam, oenanthic lactam, caprylic lactam and lauric lactam, their C- or N-substitution products, and mixtures of the aforementioned lactams. Alkaline compounds such as alkali metals and alkaline earth metals, their oxides, hydrides, hydroxides and amides, and sodium or potassium alcoholates, are used as the catalyst, in known manner. Reaction products of these substances with a lactam can also advantageously be used. The catalysts are generally added to the particular lactam melt in quantities of from 0.05 to 0.5 mol percent, preferably in quantities of from 0.1 to 0.3 mol percent.

Suitable activators are carbodiimides, cyanamide, monoisocyanates, polyisocyanates and masked isocyanates such as phenylisocyanate, tolylene-1,4-diisocyanate, hexamethylene - 1,6 - diisocyanate, $\epsilon$ - caprolactam - N-acetyl-N'-phenylamide, hexamethylene - 1,6 - bis - (carbamido-caprolactam) or N-stearoyl-caprolactam.

Suitable fibres are asbestos, metal or glass and carbon fibres or whiskers. The fibre length can be in the range from a few $\mu$ up to a few centimetres, although it is preferably in the range from $200\mu$ to 24 mm. From 1 to 80% by weight and preferably from 15 to 35% by weight of glass fibres can be worked in, depending upon the length of the fibres. In practice, the process is carried out by initially introducing the required quantity of fibres, based on the quantity of lactam melt to be introduced, into the opened mould. The mould is then closed and heated to the required polymerization temperature of from 140 to 200° C. The fibres assume the temperature of the mould after a few minutes. The polymerizable melt prepared in a melt-preparation unit is then introduced into the mould through a metering unit. The required hollow article is formed in the mould which rotates about two intersecting axes during the polymerization.

It is also possible, however, to introduce a powder-mixture of, for example, caprolactam, a reaction product of caprolactam with an alkali metal as catalyst, and an activator, for example hexamethylene-bis-carbamido caprolactam, into the mould, together with the requisite quantity of fibres. During biaxial rotation, the reactive powder-mixture melts and polymerization begins within a matter of minutes.

Containers or mouldings of high rigidity and outstanding mechanical strength are obtained by this extremely economic process.

For example, a modulus of elasticity of 46,000 kp./cm.$^2$ was measured for a strengthened polyamide-6, obtained by the activated anionic polymerization of caprolactam and reinforced with 15% of glass fibres, as against 32,000 kg./cm.² for an otherwise similar, but non-reinforced, product.

EXAMPLE 1

600 g. of unsized glass fibres having an average length of 350µ, are introduced into a forty-litre-capacity air-heated rotational mould of a square form. The mould is closed and is preheated for 6 minutes at 195° C. in a heating unit. Thereafter, 3,400 g. of a reactive polymerizable melt consisting of 99 parts by weight ε-caprolactam, 0.4 part by weight sodium lactamate and 0.6 part by weight hexamethylene-1,6-diisocyanate and having a temperature of 120° C. are introduced and the mould is set rotating again.

The rotational speeds are 17 r.p.m. around the primary shaft and 8 r.p.m. around the secondary shaft. A polymerization time of 2 minutes is followed by cooling for 1 minute. The mould is then opened and a hollow body of high molecular weight polyamide-6, reinforced with 15% by weight of glass fibres is removed. Gravimetric determination of the glass fibre content in different parts of the container reveals a content of 15±0.5% by weight, in other words the glass fibres are homogeneously distributed. The glass fibres still have an average length of 350µ.

The E-modulus measured according to DIN 53455 is 46000 kp./cm.².

EXAMPLE 2

600 g. of glass fibres with an average length of 12 mm. are introduced into an approximately ninety-litre-capacity container mould which is then heated to 195° C., 5,400 g. of a polymerizable molten mixture described in Example 1 are then introduced, and the procedure described in Example 1 is followed. The completed moulding contains 10% by weight of glass fibres in homogeneous distribution, and is distinguished by its high rigidity and dimensional stability.

EXAMPLE 3

2,150 g. of short glass fibres with an average length of 120µ containing a wetting agent, are introduced into an approximately 100-litre-capacity block-shaped rotational mould measuring 800 x 400 x 300 mm. defined by smooth surfaces, after which the mould is closed and heated to 185° C. Thereafter, 5 kg. of a polymerizable molten mixture described in Example 1 are introduced and polymerized for 2 minutes whilst the mould is rotated.

In this example, the rotational speeds are 20 r.p.m. about the primary shaft and 8 r.p.m. about the secondary shaft. On completion of polymerization, a block-shaped container containing 30% by weight of glass fibres is removed from the mould. It is distinguished in particular by its rigidity and freedom from distortion.

The E-modulus measured according to DIN 53455 is 55000 kp./cm.².

We claim:
1. A process for the production of reinforced polyamide, hollow articles by polymerization of a mixture of a lactam having at least 5 ring members, an alkaline catalyst, and a highly efficient activator which comprises the sequential steps of:
   (1) introducing reinforcing fibres into a mould at the polymerization temperature of said lactam;
   (2) after said fibres have reached approximately said polymerization temperature, introducing into the mould said mixture containing as an activator a member of the group consisting of a carbodiimide, cyanamide, isocyanate, polyisocyanate, and masked isocyanate, and rotating the closed mould about two intersecting axes during the polymerization; and
   (3) recovering said reinforced polyamide hollow article.

2. A process as claimed in claim 1, wherein β-pyrrolidone, ε-caprolactam, oenanthic lactam, caprylic lactam or lauric lactam is polymerized.

3. A process as claimed in claim 1, wherein asbestos, metal, glass, carbon fibres or whiskers are used as fibres.

4. A process as claimed in claim 1, wherein the fibres' length is in the range from 200µ to 24 mm.

5. A process as claimed in claim 1, wherein the polymerization temperature ranges from 140 to 200° C.

6. A process as claimed in claim 1, wherein 1 to 80% by weight based on the polymerizable mixture fibres are introduced into the mould.

7. A process as claimed in claim 1, wherein 15 to 35% by weight based on the polymerizable mixture fibres are introduced into the mould.

References Cited
UNITED STATES PATENTS

| | | | |
|---|---|---|---|
| 3,275,733 | 9/1966 | Schule et al. | 425—429 |
| 3,417,097 | 12/1968 | Downing et al. | 264—308 |
| 3,470,199 | 9/1969 | Jung | 264—310 |

FOREIGN PATENTS

| | | | |
|---|---|---|---|
| 757,988 | 5/1967 | Canada | 264—310 |
| 751,291 | 1/1967 | Canada | 264—LACTAM DIG. |

ROBERT F. WHITE, Primary Examiner

T. E. BALHOFF, Assistant Examiner

U.S. Cl. X.R.

264—DIGEST 56, 331